May 27, 1958 W. M. YONKERS 2,836,078
SAFETY STEERING COLUMN
Filed June 29, 1956
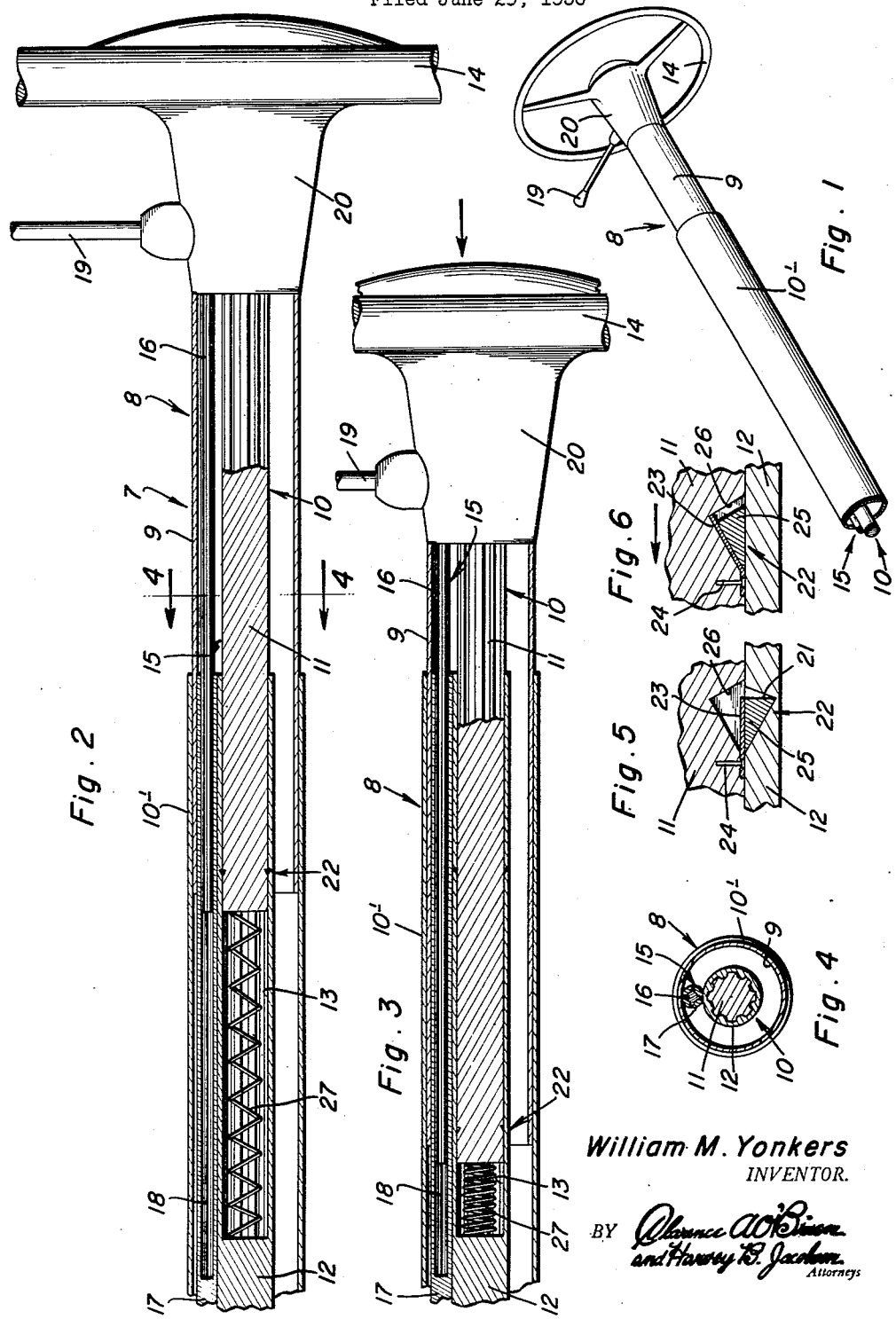
William M. Yonkers
INVENTOR.

United States Patent Office 2,836,078
Patented May 27, 1958

2,836,078

SAFETY STEERING COLUMN

William M. Yonkers, Danbury, Conn., assignor of one-half to Florence Yonkers, Danbury, Conn.

Application June 29, 1956, Serial No. 594,975

1 Claim. (Cl. 74—493)

The present invention relates to new and useful improvements in steering columns for motor vehicles and has for its primary object to provide, in a manner as hereinafter set forth, a device of this character which is longitudinally yieldable, thus greatly reducing the likelihood of injury to the operator in the event of an accident, particularly a head-on collision.

Another very important object of the invention is to provide, in a safety steering column of the type comprising telescopic sections, novel means for positively preventing said sections from separating when the column returns to its normally extended position after being contracted.

Other objects of the invention are to provide a safety steering column of the aforementioned character which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the upper portion of a safety steering column constructed in accordance with the present invention;

Figure 2 is a view in longitudinal section, showing the column extended;

Figure 3 is a longitudinal sectional view, showing the column contracted;

Figure 4 is a view in transverse section, taken substantially on the line 4—4 of Figure 2;

Figure 5 is an enlarged fragmentary sectional view, showing one of the stops in operative position; and, Figure 6 is a view substantially similar to Figure 5 but showing the stop in inoperative position, as when the column is contracted.

Referring now to the drawing in detail, it will be seen that reference character 7 designates generally a safety steering column constructed in accordance with the present invention. The column 7 includes a tubular housing 8 comprising telescopic male and female sections 9 and 10', respectively.

Mounted centrally in the housing 8 in spaced, concentric relation thereto is a steering shaft 10. The shaft 10 comprises splined, telescopic upper and lower male and female sections 11 and 12, respectively. A longitudinal bore or socket 13 in the upper portion of the female shaft section 12 slidably accommodates the male section 11 of said shaft.

Mounted on the upper end of the shaft 10 is a conventional steering wheel 14. Mounted in the housing 8 between said housing and the shaft 10 is a gear shift rod 15. The rod 15 includes splined, telescopic male and female sections 16 and 17, respectively. The upper portion of the rod section 17 has formed longitudinally therein a bore or socket 18 which slidably accommodates the male section 16 of the shift rod 15. The rod 15 is actuated by the usual lever 19 on the hub 20 of the wheel 14.

The wall of the bore 13 of the shaft section 12 has formed therein at circumferentially spaced points a plurality of substantially triangular recesses or notches 21. The notches 21 are for the reception of resilient stop dogs 22 on the shaft section 11. The stop dogs 22 comprise, in the embodiment shown, flat springs 23 having one end portion secured to the shaft section 11 by pins 24 and having mounted thereon substantially triangular blocks or members 25 which are engageable in the notches or recesses 21. Substantially triangular recesses 26 in the shaft section 11 receive the stop dogs 22 when said dogs are in retracted or inoperative position, as shown in Figure 6 of the drawing.

Mounted in the bore or socket 13 of the female shaft section 12 is a coil spring 27 which yieldingly urges the shaft section 11 toward its extended position.

It is thought that the operation of the invention will be readily apparent from a consideration of the foregoing. Briefly, the parts comprising the assembly are normally in the position of Figure 2 of the drawing with the dogs 22 engaged in the sockets 21. However, when sufficient forward pressure is applied to the wheel 14, as in the event of a collision, the column 7 contracts to the position of Figure 3 of the drawing against the tension of the coil spring 27, the dogs 22 riding out of the sockets or notches 21 as shown in Figure 6 of the drawing. When the pressure is eliminated, the coil spring 27 immediately returns the shaft section 11 to its extended position where it is arrested by the dogs 22 reentering the sockets or notches 21.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A safety steering column of the character described comprising: a tubular housing including telescopic male and female sections, a steering shaft rotatable in said housing and including splined, telescopic male and female sections, said female shaft section having a longitudinal bore therein slidably accommodating said male shaft section, a coil spring in the bore yieldingly urging said male shaft section toward extended position, the wall of the bore of said female shaft section having a plurality of circumferentially spaced notches therein, flat springs mounted on the male shaft section, and blocks on said springs engageable in the notches for arresting the male shaft section in extended position.

References Cited in the file of this patent

FOREIGN PATENTS 602,209    France _____ Dec. 21, 1925